United States Patent
Huang

(10) Patent No.: US 11,541,437 B2
(45) Date of Patent: Jan. 3, 2023

(54) CLEANING METHOD AND CLEANING DEVICE

(71) Applicant: HKC CORPORATION LIMITED, Shenzhen (CN)

(72) Inventor: Bei Zhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/326,931

(22) PCT Filed: Oct. 23, 2018

(86) PCT No.: PCT/CN2018/111410
§ 371 (c)(1),
(2) Date: Feb. 21, 2019

(87) PCT Pub. No.: WO2020/051998
PCT Pub. Date: Mar. 19, 2020

(65) Prior Publication Data
US 2021/0331219 A1    Oct. 28, 2021

(30) Foreign Application Priority Data
Sep. 10, 2018  (CN) .......................... 201811050297.7

(51) Int. Cl.
*B08B 13/00* (2006.01)
*B08B 3/02* (2006.01)
(Continued)

(52) U.S. Cl.
CPC .............. *B08B 13/00* (2013.01); *B08B 3/022* (2013.01); *B08B 5/023* (2013.01); *F26B 21/004* (2013.01); *G02F 1/1316* (2021.01)

(58) Field of Classification Search
None
See application file for complete search history.

(56) References Cited

U.S. PATENT DOCUMENTS

| | | | | |
|---|---|---|---|---|
| 6,021,790 A | * | 2/2000 | Yoshitani | .......... H01L 21/67706 134/122 R |
| 2007/0281094 A1 | * | 12/2007 | Nishio | .................... B08B 5/023 15/300.1 |
| 2011/0197632 A1 | * | 8/2011 | Lu | .......................... B08B 3/022 134/122 R |

FOREIGN PATENT DOCUMENTS

| | | |
|---|---|---|
| CN | 102357479 A | 2/2012 |
| CN | 102847631 A | 1/2013 |

(Continued)

OTHER PUBLICATIONS

English Machine Translation of CN 105057300A.*

(Continued)

*Primary Examiner* — Nicole Blan

(57) ABSTRACT

The present application discloses a cleaning method and a cleaning device. The cleaning method includes the following steps: dividing a cleaning device into at least two regions to control for the same cleaning mode; detecting a width of an object to be cleaned; and turning on the cleaning device of corresponding region according to the width of the object to be cleaned. The cleaning device includes a detection structure, a conveying structure, a washing structure, an air knife structure, and a control structure, where the washing structure is divided into at least two regions, and the air knife structure is also divided into at least two regions.

8 Claims, 8 Drawing Sheets

(51) Int. Cl.
B08B 5/02 (2006.01)
F26B 21/00 (2006.01)
G02F 1/13 (2006.01)

(56) References Cited

FOREIGN PATENT DOCUMENTS

| | | |
|---|---|---|
| CN | 204208872 U | 3/2015 |
| CN | 104588351 A | 5/2015 |
| CN | 105057300 A | 11/2015 |
| CN | 105728383 A | 7/2016 |
| CN | 107579019 A | 1/2018 |
| JP | 2004141722 A | 5/2004 |

OTHER PUBLICATIONS

English Machine Translation of CN 102847631A.*
Wen Liu, the International Searching Authority written comments, dated Apr. 2019, CN.

* cited by examiner

CLEANING METHOD AND CLEANING DEVICE

The present application claims priority to the Chinese Patent Application No. CN201811050297.7, filed to the Chinese Patent Office on Sep. 10, 2018, and entitled "CLEANING METHOD AND CLEANING DEVICE", which is incorporated herein by reference in its entirety.

TECHNICAL FIELD

The present application relates to the technical field of display, and in particular, to a cleaning method and a cleaning device.

BACKGROUND

It should be understood that the statements herein merely provide background information related to the present application and do not necessarily constitute the prior art.

A liquid crystal display has many advantages such as thin body, power-saving, and no radiation, and thus has been widely used. Most of the liquid crystal displays are backlight liquid crystal displays, which include a liquid crystal panel and a backlight module. The working principle of the liquid crystal panel is to place liquid crystal molecules in two parallel glass substrates, and apply driving voltages on the two glass substrates to control the rotation direction of the liquid crystal molecules to refract the light of the backlight module to generate a picture.

In the production process of panels, there is a process of cleaning surfaces of the edged panels, the edged panels pass through a pre-washing section of a cleaning machine, the panels are cleaned in a brush section, and then after rinsed with various liquids and dried through an air knife structure, the edging scraps or debris on the surfaces of the panels are cleaned for subsequent processing. However, in the process of cleaning, the sizes of the panels are different, and the cleaning device is completely turned on for cleaning, which causes waste of energy.

SUMMARY

The problem to be solved by the present application is to provide a cleaning method and a cleaning device for saving energy.

To achieve the foregoing objective, the present application provides a cleaning method, which includes the following steps:

dividing a cleaning device into at least two regions to control for the same cleaning mode;

detecting a width of an object to be cleaned; and turning on the cleaning device of corresponding region according to the width of the object to be cleaned to clean the object to be cleaned.

The present application further discloses a cleaning device, which includes:

a detection structure, configured to detect a width and position of an object to be cleaned;

a conveying structure, configured to drive the object to be cleaned to move forward;

a washing structure, configured to clean the object to be cleaned with liquid; and an air knife structure, configured to blow off residual liquid and debris on the surface of the object to be cleaned.

The washing structure is divided into at least two regions; and the air knife structure is also divided into at least two regions.

The cleaning device further includes a control structure, where the control structure is connected to the detection structure and is configured to control turn-on of the washing structure or the air knife structure of corresponding region according to the width and position of the object to be cleaned obtained by the detection mechanism to clean the object to be cleaned.

The general cleaning device is completely turned on when objects to be cleaned enter, but the sizes of the objects to be cleaned are different. When cleaning the smaller object to be cleaned, some regions of the cleaning device are not used, and thus energy is wasted. Therefore, the cleaning device is divided into at least two regions to control for the same cleaning mode, and the corresponding regions can be turned on or off according to the widths of the objects to be cleaned, and energy-saving can be ensured in the case that the cleaning is done well. Moreover, the present application does not modify hardware of the device, and the cost is low.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
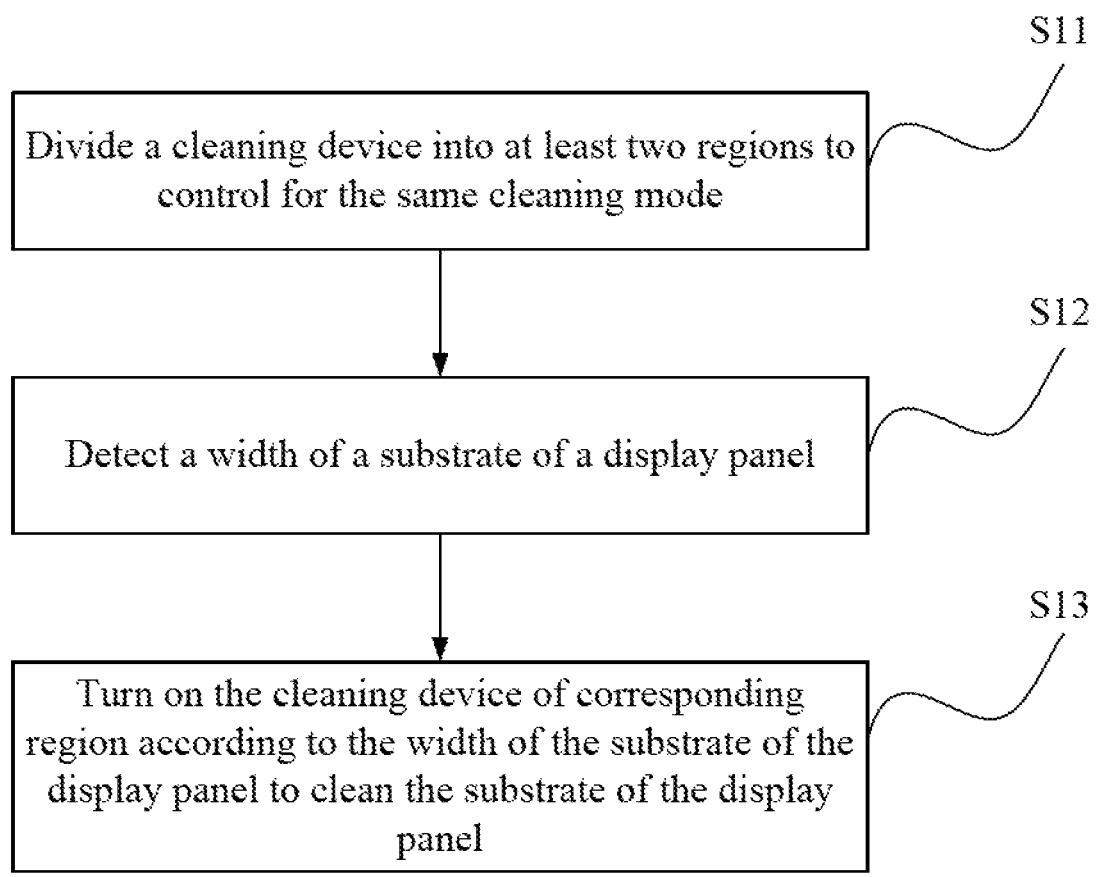
FIG. 1 is a schematic diagram of a method for turning on a cleaning device according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood by a person of ordinary skill in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

The present application is further described below with reference to the accompanying drawings and preferred embodiments by taking cleaning a substrate of a display panel as an example.

The edged display panel passes through the liquid cleaning stage of the cleaning machine, and after the washing, it is blown through an air knife section. In this way, for the small-sized display panel, the entire cleaning device is turned on during the cleaning process, which causes waste of energy.

Figure 2:
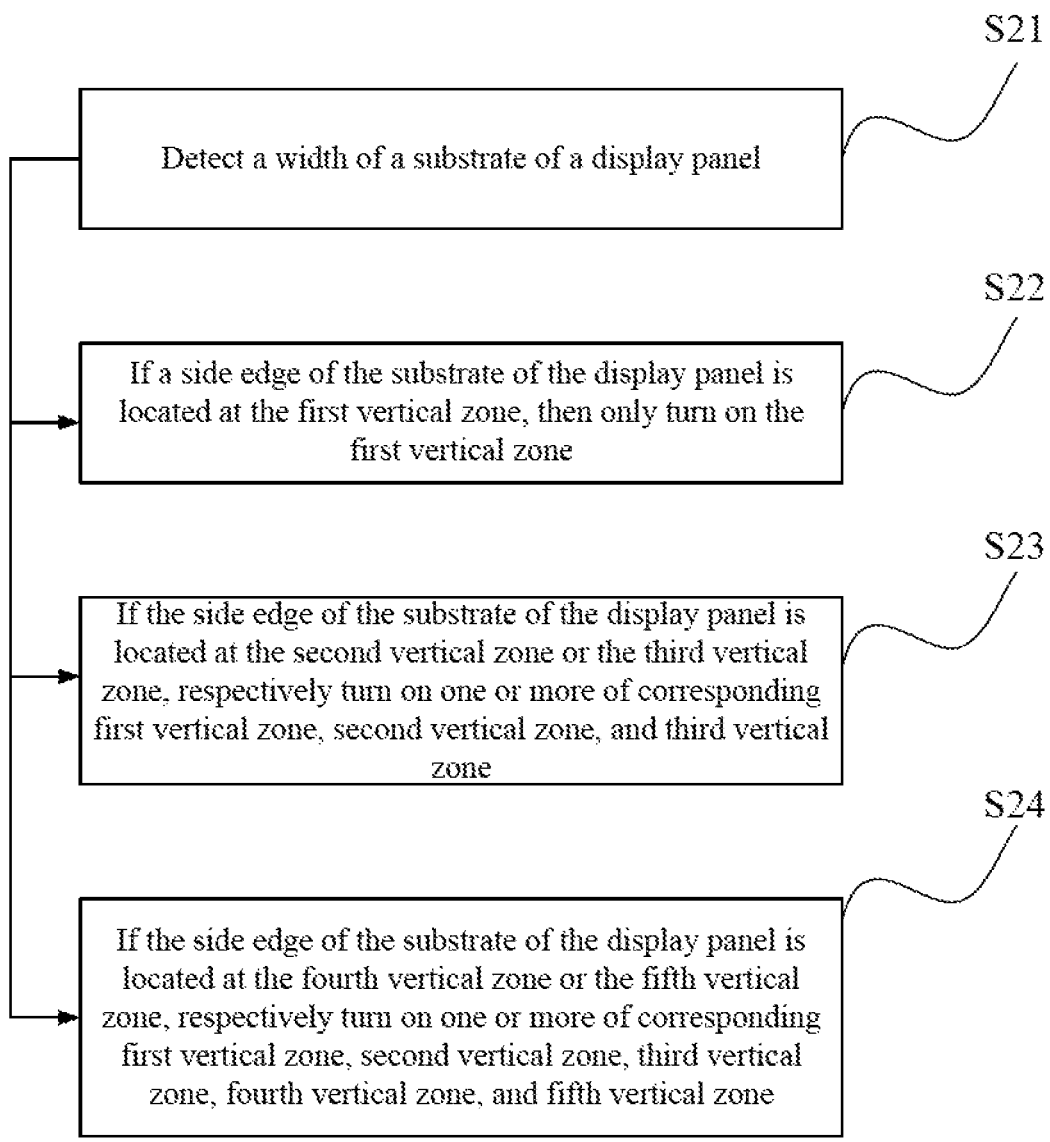
FIG. 2 is a schematic diagram of a method for controlling a vertical region of a first processing section of the cleaning device according to an embodiment of the present application.
Figure 3:
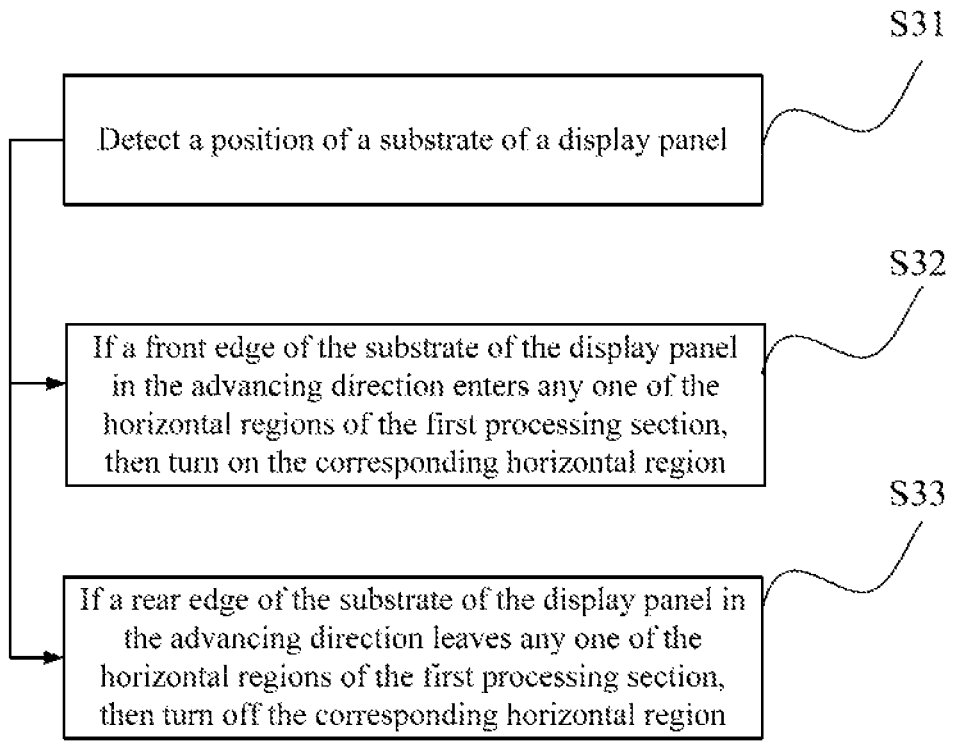
FIG. 3 is a schematic diagram of a method for controlling a horizontal region of a first processing section of the cleaning device according to an embodiment of the present application.
Figure 4:
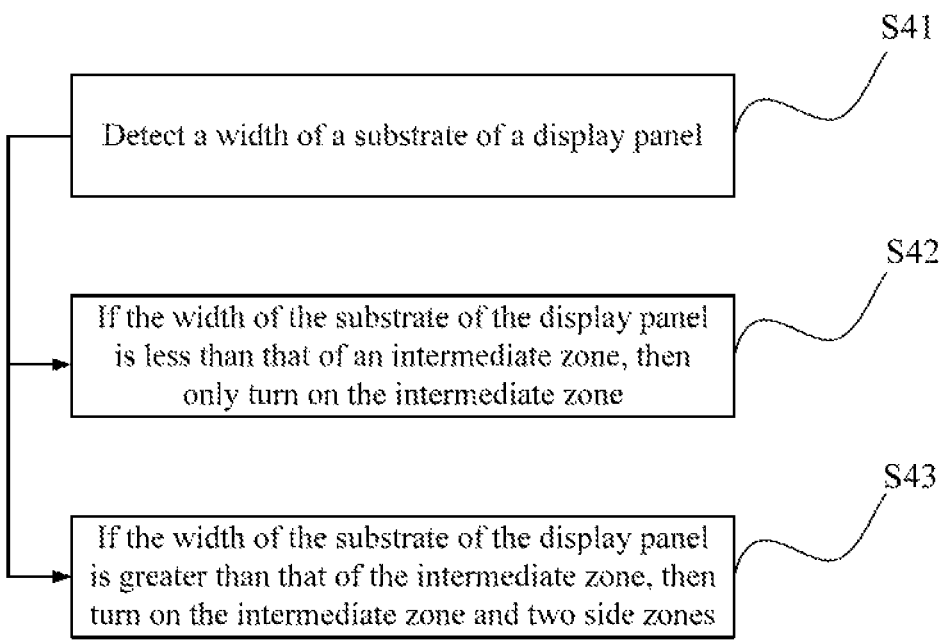
FIG. 4 is a schematic diagram of a method for controlling an intermediate zone and two side zones of a second processing section of the cleaning device according to an embodiment of the present application.
Figure 5:
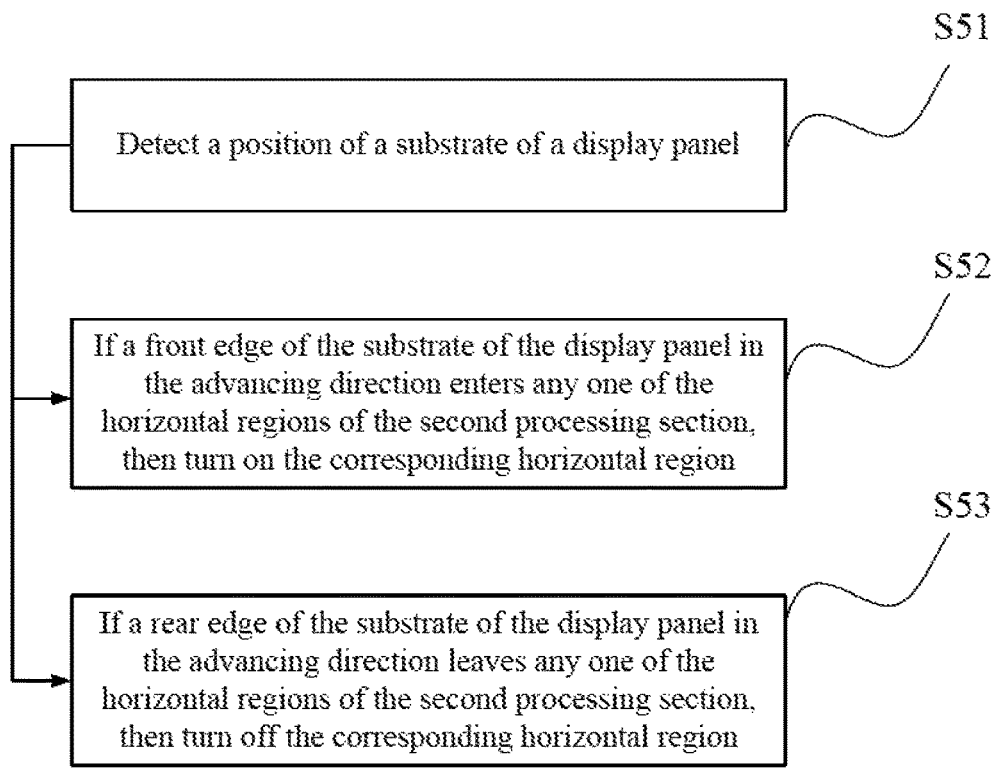
FIG. 5 is a schematic diagram of a method for controlling a horizontal region of a second processing section of the cleaning device according to an embodiment of the present application.
Figure 6:
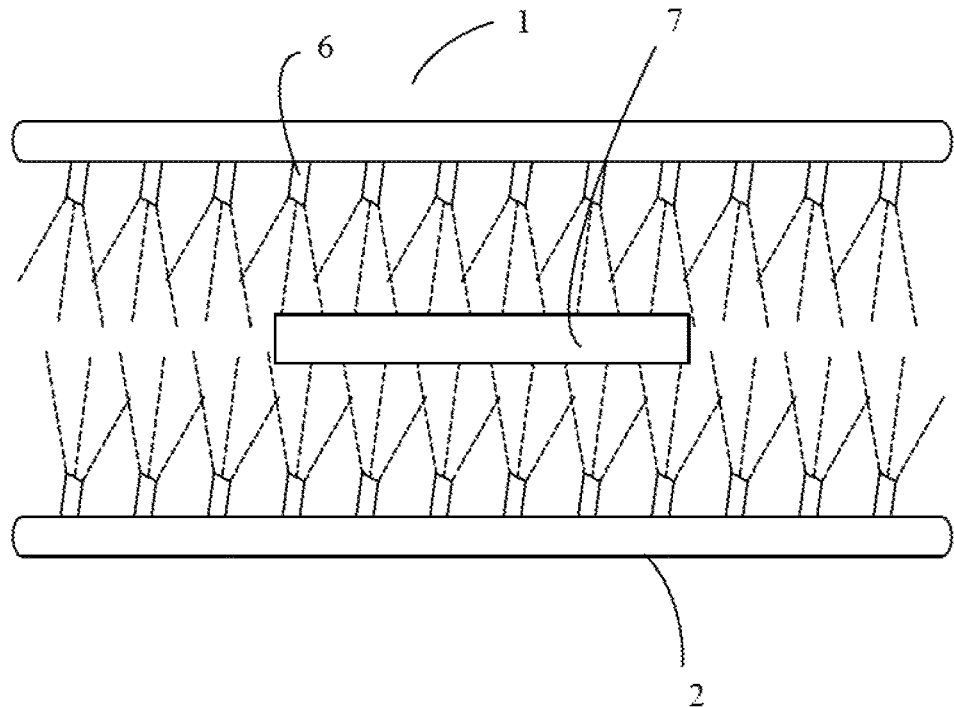
FIG. 6 is a schematic diagram of a washing structure of the cleaning device according to an embodiment of the present application.
Figure 7:
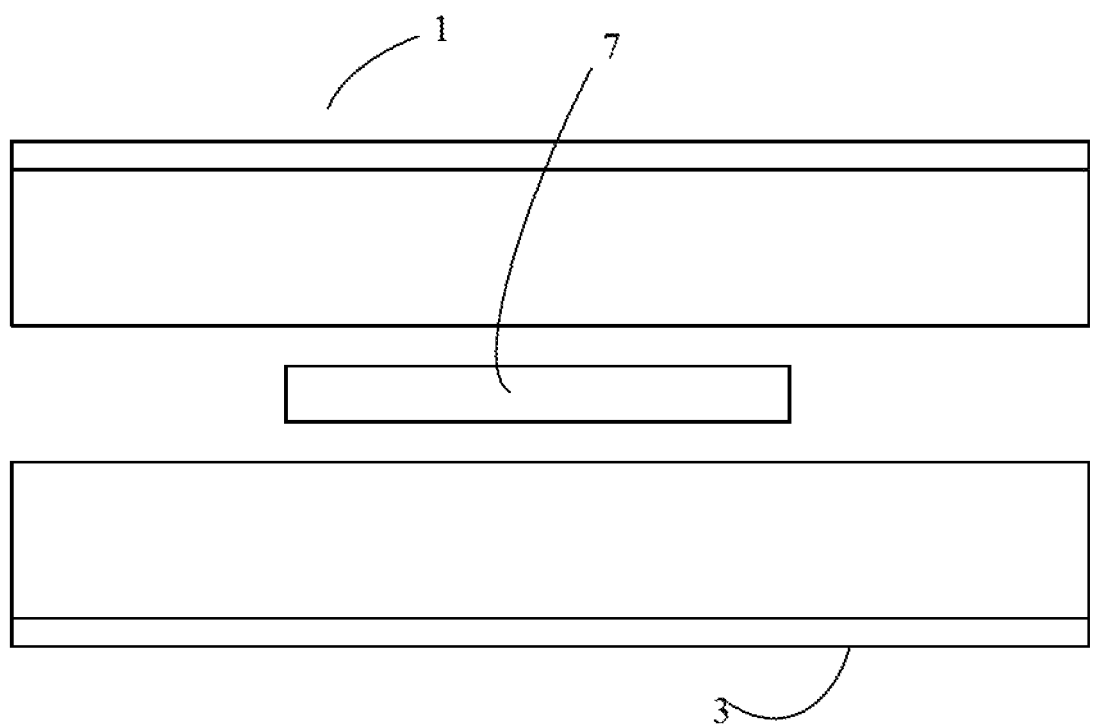
FIG. 7 is a schematic diagram of an air knife structure of the cleaning device according to an embodiment of the present application.
Figure 8:
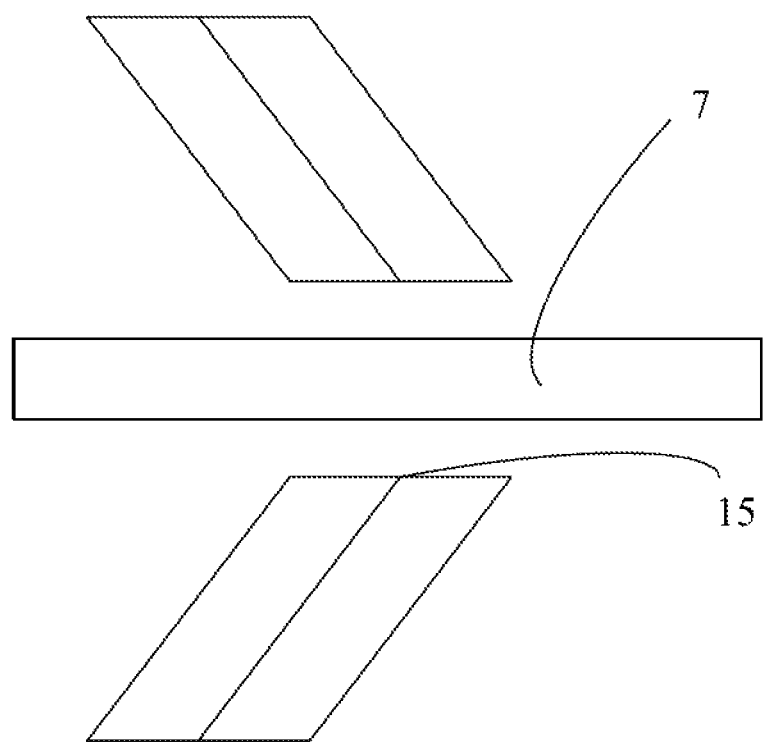
FIG. 8 is a schematic diagram of a side surface of the air knife structure of the cleaning device according to an embodiment of the present application.
Figure 9:
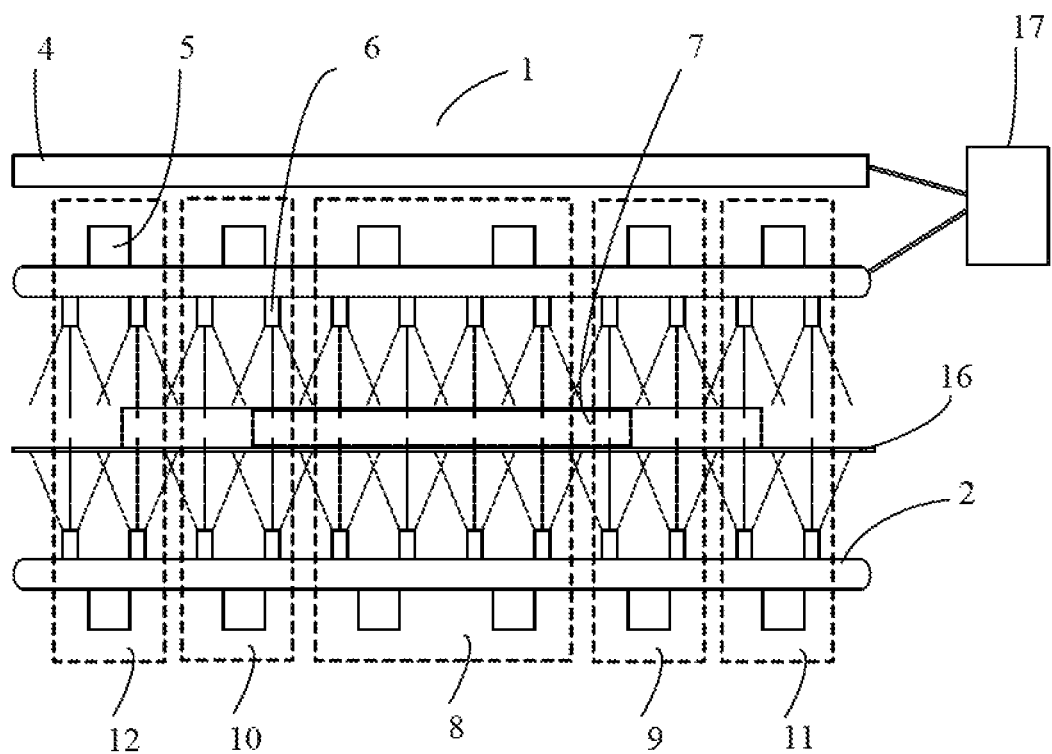
FIG. 9 is a schematic diagram of an entire first processing section of the cleaning device according to an embodiment of the present application.
Figure 10:
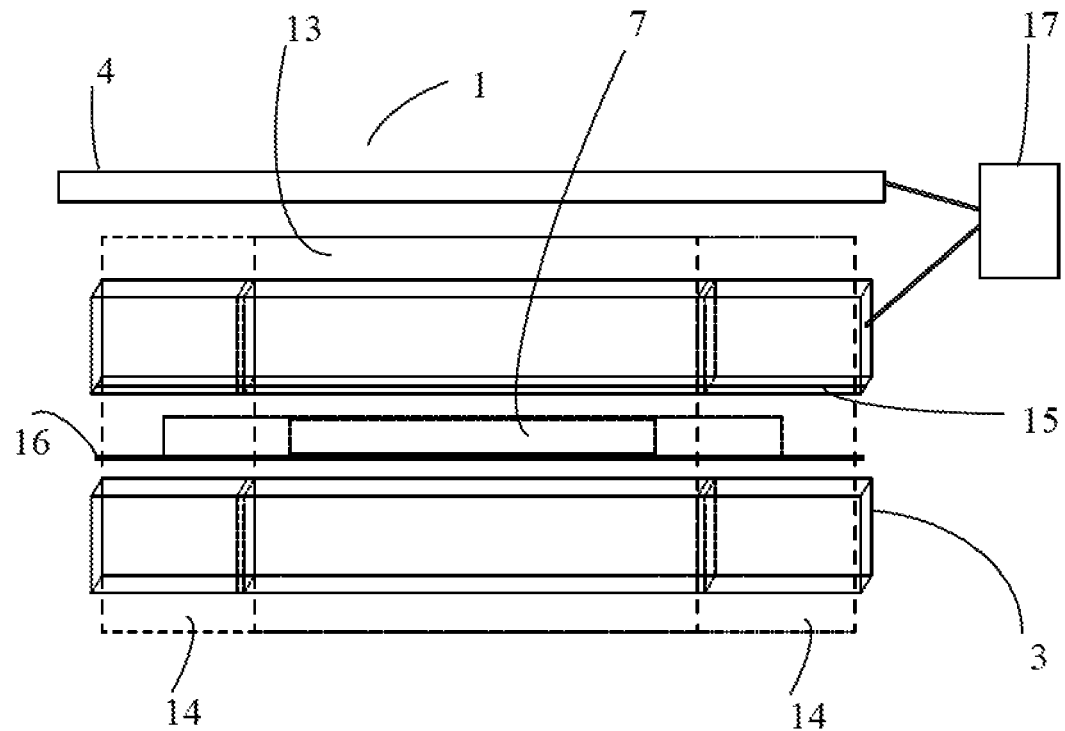
FIG. 10 is a schematic diagram of an entire second processing section of the cleaning device according to an embodiment of the present application.
Figure 11:
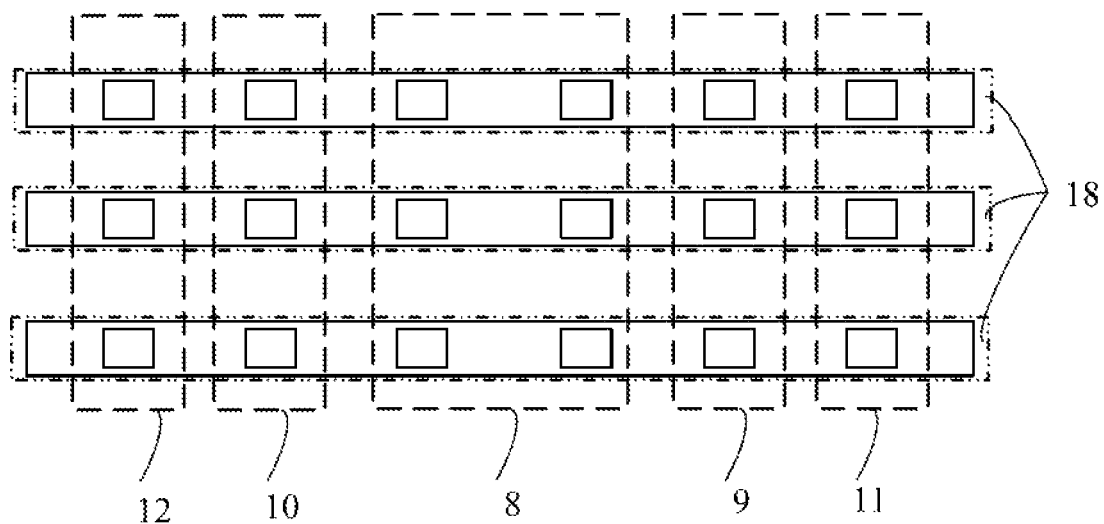
FIG. 11 is a schematic diagram of region division of the first processing section of the cleaning device according to an embodiment of the present application.
Figure 12:
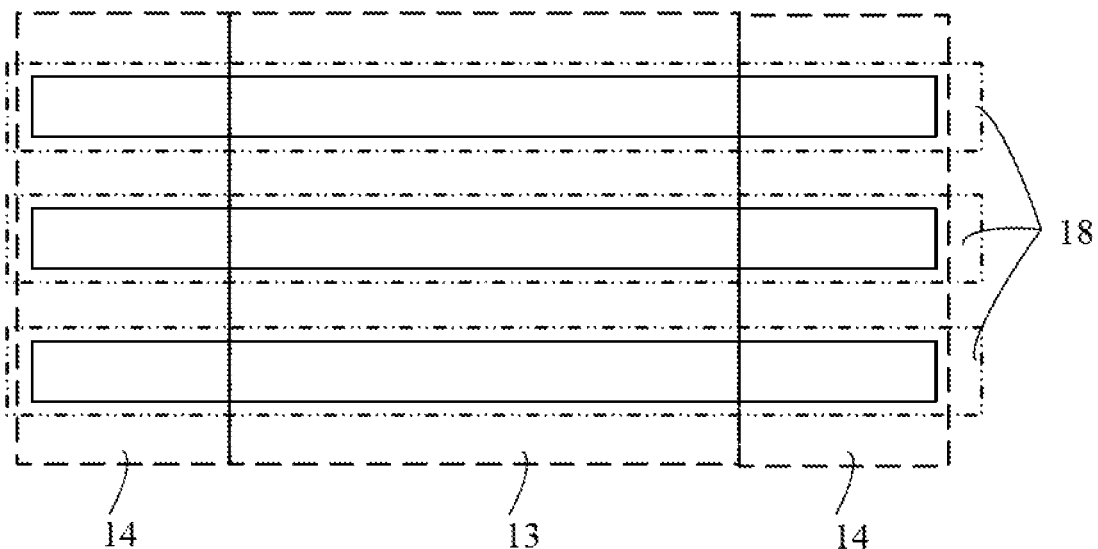
FIG. 12 is a schematic diagram of region division of the second processing section of the cleaning device according to an embodiment of the present application.
Figure 13:
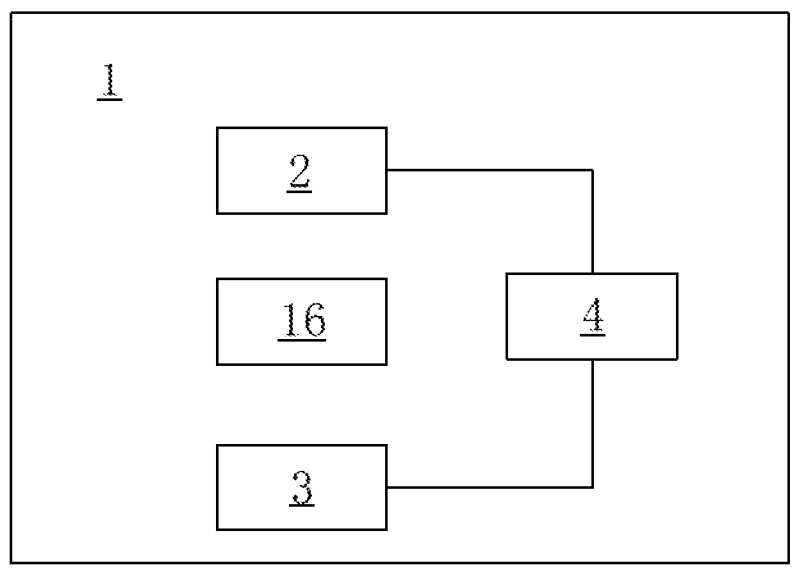
FIG. 13 is a schematic diagram of the structure of the cleaning device according to an embodiment of the present application.

As shown in FIGS. 1-12, an embodiment of the present application discloses a cleaning method of a substrate 7 of a display panel, which includes the following steps:

S11: Divide a cleaning device 1 into at least two regions to control for the same cleaning mode.

S12: Detect a width of the substrate 7 of the display panel.

S13: Turn on the cleaning device 1 of corresponding region according to the width of the substrate 7 of the display panel to clean the substrate 7 of the display panel.

The cleaning device 1 includes a first processing section and a second processing section, and the cleaning modes of the first processing section and the second processing section are different.

The first processing section includes a first vertical zone 8, a second vertical zone 9, and a third vertical zone 10: the second vertical zone 9 and the third vertical zone 10 are symmetrically provided at two sides of the first vertical zone 8 and are connected to the first vertical zone 8; the step of controlling the first processing section includes:

S21: Detect the width of the substrate 7 of the display panel.

S22: If a side edge of the substrate 7 of the display panel is located at the first vertical zone 8, then only turn on the first vertical zone 8.

S23: If the side edge of the substrate 7 of the display panel is located at the second vertical zone 9 or the third vertical zone 10, respectively turn on one or more of corresponding first vertical zone 8, second vertical zone 9, and third vertical zone 10.

The second processing section includes an intermediate zone 13 and two side zones 14; the two side zones 14 are provided at two sides of the intermediate zone 13 and are connected to the intermediate zone 13; the step of controlling the second processing section includes:

S41: Detect the width of the substrate 7 of the display panel.

S42: If the width of the substrate 7 of the display panel is less than that of the intermediate zone 13, then only turn on the intermediate zone 13.

S43: If the width of the substrate 7 of the display panel is greater than that of the intermediate zone 13, then turn on the intermediate zone 13 and the two side zones 14.

As shown in FIGS. 1-12, another embodiment of the present application discloses a cleaning method of a substrate 7 of a display panel, which includes the following steps:

S11: Divide a cleaning device 1 into at least two regions to control for the same cleaning mode.

S12: Detect a width of the substrate 7 of the display panel.

S13: Turn on the cleaning device 1 of corresponding region according to the width of the substrate 7 of the display panel to clean the substrate 7 of the display panel.

The general cleaning device 1 is completely turned on when the substrate 7 of the display panel enters, but the sizes of the substrate 7 of the display panel are different. When cleaning smaller substrate 7 of the display panel, some regions of the cleaning device 1 are not used, and thus energy is wasted. Therefore, the cleaning device 1 is divided into at least two regions to control for the same cleaning mode, and the corresponding regions can be turned on or off according to the width of the substrate 7 of the display panel, and energy-saving can be ensured in the case that the cleaning is done well. Moreover, the present application does not modify hardware of the device, and the cost is low.

Optionally, in this embodiment, the cleaning device 1 includes a first processing section and a second processing section, and the cleaning modes of the first processing section and the second processing section are different.

The control region of the cleaning device 1 is divided into a first processing section and a second processing section, which can be turned on separately in the working process, thereby saving energy.

Optionally, in this embodiment, the first processing section includes a first vertical zone 8, a second vertical zone 9, and a third vertical zone 10; the second vertical zone 9 and the third vertical zone 10 are symmetrically provided at two sides of the first vertical zone 8 and are connected to the first vertical zone 8; the step of controlling the first processing section includes:

S21: Detect the width of the substrate 7 of the display panel.

S22: If a side edge of the substrate 7 of the display panel is located at the first vertical zone 8, then only turn on the first vertical zone 8.

S23: If the side edge of the substrate 7 of the display panel is located at the second vertical zone 9 or the third vertical zone 10, respectively turn on one or more of corresponding first vertical zone 8, second vertical zone 9, and third vertical zone 10.

The zones are respectively controlled according to the width of the substrate 7 of the display panel, thereby saving energy.

Optionally, in this embodiment, the first processing section includes a fourth vertical zone 11 and a fifth vertical zone 12; the fourth vertical zone 11 is provided outside the second vertical zone 9 and is connected to the second vertical zone 9; the fifth vertical zone 12 is provided outside the third vertical zone 10 and is connected to the third vertical zone 10: the step of controlling the first processing section includes:

S21: Detect a position of the substrate 7 of the display panel.

S22: If a side edge of the substrate 7 of the display panel is located at the first vertical zone 8, then only turn on the first vertical zone 8.

S23: If the side edge of the substrate 7 of the display panel is located at the second vertical zone 9 or the third vertical zone 10, respectively turn on one or more of corresponding first vertical zone 8, second vertical zone 9, and third vertical zone 10.

S24: If the side edge of the substrate 7 of the display panel is located at the fourth vertical zone 11 or the fifth vertical zone 12, respectively turn on one or more of corresponding first vertical zone 8, second vertical zone 9, third vertical zone 10, fourth vertical zone 11, and fifth vertical zone 12.

The first processing section is divided into five vertical zones, and corresponding vertical zone is correspondingly turned on according to the width of the substrate 7 of the display panel, ensuring more detailed control in the case of comprehensively cleaning, and saving the energy of the vertical zones which are not involved.

Optionally, in this embodiment, the first processing section is divided into at least two horizontal regions 18 in a direction perpendicular to the advancing direction of the substrate 7 of the display panel.

The step of controlling the first processing section includes:

S31: Detect the position of the substrate 7 of the display panel.

S32: If a front edge of the substrate 7 of the display panel in the advancing direction enters any one of the horizontal regions 18 of the first processing section, then turn on the corresponding horizontal region 18.

S33: If a rear edge of the substrate 7 of the display panel in the advancing direction leaves any one of the horizontal regions 18 of the first processing section, then turn off the corresponding horizontal region 18.

In the advancing process of the substrate 7 of the display panel, corresponding horizontal region 18 is turned on when entering the horizontal region 18, and corresponding horizontal region 18 is turned off when leaving the horizontal region 18, and only the horizontal region 18 corresponding to the substrate 7 of the display panel is turned on, thereby saving energy.

Optionally, in this embodiment, the second processing section includes an intermediate zone 13 and two side zones 14; the two side zones 14 are provided at two sides of the intermediate zone 13 and are connected to the intermediate zone 13; the step of controlling the second processing section includes:

S41: Detect the width of the substrate 7 of the display panel.

S42: If the width of the substrate 7 of the display panel is less than that of the intermediate zone 13, then only turn on the intermediate zone 13.

S43: If the width of the substrate 7 of the display panel is greater than that of the intermediate zone 13, then turn on the intermediate zone 13 and the two side zones 14.

The second processing section is divided into an intermediate zone 13 and two side zones 14 to control, and the two side zones 14 can be correspondingly turned on and off according to the width of the substrate 7 of the display panel, thereby saving energy.

Optionally, in this embodiment, the second processing section is divided into at least two horizontal regions 18 in a direction perpendicular to the advancing direction of the substrate 7 of the display panel. The step of controlling the second processing section includes:

S51: Detect the position of the substrate 7 of the display panel.

S52: If a front edge of the substrate 7 of the display panel in the advancing direction enters any one of the horizontal regions 18 of the second processing section, then turn on the corresponding horizontal region 18.

S53: If a rear edge of the substrate 7 of the display panel in the advancing direction leaves any one of the horizontal regions 18 of the second processing section, then turn off the corresponding horizontal region 18.

In the advancing process of the substrate 7 of the display panel, corresponding horizontal region 18 is turned on when entering the horizontal region 18, and corresponding horizontal region 18 is turned off when leaving the horizontal region 18, and only the horizontal region 18 corresponding to the substrate 7 of the display panel is turned on, thereby saving energy.

Optionally, in this embodiment, the first processing section is a washing region, and the second processing section is an air knife region.

With reference to FIGS. 6-12, another embodiment of the present application discloses a cleaning device 1, which includes:

a detection structure 4, configured to detect a width and position of a substrate 7 of a display panel;

a conveying structure 16, configured to drive the substrate 7 of the display panel to move forward;

a washing structure 2, configured to clean the substrate 7 of the display panel with liquid through a water orifice 6; and an air knife structure 3, configured to blow off residual liquid and debris on the surface of the substrate 7 of the display panel through a blowing port 15.

The washing structure 2 is divided into at least two regions; and the air knife structure 3 is also divided into at least two regions.

The cleaning device 1 further includes a control structure 17, where the control structure 17 is connected to the detection structure 4 and is configured to control turn-on of the washing structure 2 or the air knife structure 3 of corresponding region according to the width and position of the substrate 7 of the display panel obtained by the detection mechanism to clean the substrate 7 of the display panel.

Optionally, in this embodiment, the washing structure 2 includes water supply ports 5; two columns of water supply ports 5 are divided into one control group; and one water supply port can supply water to two water orifices 6.

The two columns of water supply ports 5 that are simultaneously opened are divided into one control group, which reduces the required control structure 17 and facilitates control.

The panel in the present application may be a Twisted Nematic (TN) panel, an In-Plane Switching (IPS) panel, and a Multi-domain Vertical Alignment (VA) panel, and of course, may also be other types of panels, if appropriate.

The contents above are further detailed descriptions of the present application in conjunction with specific preferred embodiments, and it cannot be affirmed that the specific implementation of the present application is only limited to these descriptions. It will be apparent to a person of ordinary skill in the art that various simple deductions or substitutions may be made without departing from the spirit of the present application, and should be considered to fall into the scope of protection of the present application.

What is claimed is:

1. A cleaning method, comprising:

dividing a cleaning device into at least two regions for independent control with respect to a same cleaning mode;

detecting a width of an object to be cleaned; and turning on corresponding region or regions of the cleaning device according to the width of the object to be cleaned to clean the object;

wherein the cleaning device comprises a first processing section and a second processing section, and the cleaning modes of the first processing section and the second processing section are different; wherein each of the first processing section and the second processing section of the cleaning device is divided into at least two regions that are independently controlled to be turned on or off for cleaning the object when the object is being cleaned at each of the first processing section and the second processing section;

the first processing section comprises a first vertical zone, a second vertical zone, and a third vertical zone; the second vertical zone and the third vertical zone are symmetrically provided at two outer sides of the first vertical zone and are connected to the first vertical zone; wherein controlling the first processing section comprises:

detecting a width of an object to be cleaned;

in response to detecting that both side edges of the object to be cleaned are located at the first vertical zone, then only turning on the first vertical zone; and in response to detecting that each of both side edges of the object to be cleaned is located at the second vertical zone or the third vertical zone, turning on corresponding one or more of the first vertical zone, the second vertical zone, and the third vertical zone;

wherein the second processing section comprises an intermediate zone and two side zones; the two side zones are provided at two outer sides of the intermediate zone and are connected to the intermediate zone; wherein controlling the second processing section comprises:

detecting a width of an object to be cleaned;

in response to detecting that the width of the object to be cleaned is less than that of the intermediate zone, only turning on the intermediate zone; and in response to detecting that the width of the object to be cleaned is greater than that of the intermediate zone, turning on the intermediate zone and the two side zones;

wherein the object to be cleaned is a glass substrate used for manufacturing a display panel, and the glass substrate is placed horizontally to be cleaned; wherein the first processing section of the cleaning device comprises an upper portion disposed above the glass substrate and configured for water cleaning an upper side of the glass substrate, and a lower portion disposed under the glass substrate and configured for water cleaning a lower side of the glass substrate, and wherein controlling the first processing section for water cleaning the glass substrate comprises:

simultaneously water cleaning the upper side of the glass substrate using the upper portion of the first processing section and cleaning the lower side of the glass substrate using the lower portion of the first processing section;

wherein each of the upper portion and the lower portion of the first processing section of the cleaning device comprises at least two horizontal elongated portions perpendicular to an advancing direction of the glass substrate when being conveyed in the cleaning device, wherein each of the at least two horizontal elongated portions is divided into the first vertical zone, the second vertical zone, and the third vertical zone, and wherein controlling the first processing section for cleaning the glass substrate comprises:

detecting a position of the glass substrate to be water cleaned;

in response to detecting that a front edge of the glass substrate to be cleaned in the advancing direction enters each of the at least two horizontal elongated portions of the first processing section, turning on this horizontal elongated portion for water cleaning the glass substrate; and in response to detecting that a rear edge of the glass substrate to be cleaned in the advancing direction leaves each of the at least two horizontal elongated portions of the first processing section, turning off this horizontal elongated portion to stop water cleaning the glass substrate;

wherein each of the upper portion and the lower portion of the first processing section of the cleaning device has three horizontal elongated portions that are parallel to each other and separated from each other at regular intervals; wherein of each of the three horizontal elongated portions, the first vertical zone has two water supply ports, and each of the second vertical zone and the third vertical zone has one water supply port, wherein each of the water supply ports is connected to two water orifices for ejecting water to clean the glass substrate.

2. A cleaning method, comprising:

dividing a cleaning device into at least two regions for independent control with respect to a same cleaning mode;

detecting a width of an object to be cleaned; and turning on corresponding region or regions of the cleaning device according to the width of the object to be cleaned to clean the object;

wherein the cleaning device comprises a first processing section and a second processing section, and wherein the cleaning modes of the first processing section and the second processing section are different; and wherein each of the first processing section and the second processing section of the cleaning device is divided into at least two regions that are independently controlled to be turned on or off for cleaning the object when the object is being cleaned at each of the first processing section and the second processing section;

wherein the first processing section is a water washing region, and the second processing section is an air knife region, wherein the object to be cleaned is first delivered to the first processing section for water cleaning and then delivered to the second processing section for air cleaning;

wherein the object to be cleaned is a glass substrate used for manufacturing a display panel, and the glass substrate is placed horizontally to be cleaned; wherein the first processing section of the cleaning device comprises an upper portion disposed above the glass substrate and configured for water cleaning an upper side of the glass substrate, and a lower portion disposed under the glass substrate and configured for water cleaning a lower side of the glass substrate, and wherein controlling the first processing section for water cleaning the glass substrate comprises:

simultaneously water cleaning the upper side of the glass substrate using the upper portion of the first processing section and cleaning the lower side of the glass substrate using the lower portion of the first processing section;

wherein each of the upper portion and the lower portion of the first processing section of the cleaning device comprises at least two horizontal elongated portions perpendicular to an advancing direction of the glass substrate when being conveyed in the cleaning device, wherein each of the at least two horizontal elongated portions is divided into a first vertical zone, a second vertical zone, and a third vertical zone, wherein the second vertical zone and the third vertical zone are symmetrically disposed at two outer sides of the first vertical zone and are connected to the first vertical zone, and wherein controlling the first processing section for cleaning the glass substrate comprises:

detecting a position of the glass substrate to be water cleaned;

in response to detecting that a front edge of the glass substrate to be cleaned in the advancing direction enters each of the at least two horizontal elongated portions of the first processing section, turning on this horizontal elongated portion for water cleaning the glass substrate; and in response to detecting that a rear edge of the glass substrate to be cleaned in the advancing direction leaves each of the at least two horizontal elongated portions of the first processing section, turning off this horizontal elongated portion to stop water cleaning the glass substrate;

wherein each of the upper portion and the lower portion of the first processing section of the cleaning device has three horizontal elongated portions that are parallel to each other and separated from each other at regular intervals; wherein of each of the three horizontal elongated portions, the first vertical zone has two water supply ports, and each of the second vertical zone and the third vertical zone has one water supply port, wherein each of the water supply ports is connected to two water orifices for ejecting water to clean the glass substrate.

3. The cleaning method according to claim 2, wherein controlling the first processing section comprises:

detecting the width of the object to be cleaned;

in response to detecting that both side edges of the object to be cleaned are located at the first vertical zone, then only turning on the first vertical zone; and in response to detecting that each of both side edges of the object to be cleaned is located at the second vertical zone or the third vertical zone, turning on corresponding one or more of the first vertical zone, the second vertical zone, and the third vertical zone.

4. The cleaning method according to claim 3, wherein the first processing section further comprises a fourth vertical zone and a fifth vertical zone; the fourth vertical zone is provided at an outer side to the second vertical zone and is connected to the second vertical zone; the fifth vertical zone is provided at an outer side to the third vertical zone and is connected to the third vertical zone; wherein controlling the first processing section comprises:

detecting the width of the object to be cleaned;

in response to detecting that both side edges of the object to be cleaned are located at the first vertical zone, then only turning on the first vertical zone;

in response to detecting that each of both side edges of the object to be cleaned is located at the second vertical zone or the third vertical zone, turning on corresponding one or more of the first vertical zone, the second vertical zone, and the third vertical zone; and in response to detecting that each of both side edges of the object to be cleaned is located at the fourth vertical zone or the fifth vertical zone, turning on corresponding one or more of the first vertical zone, the second vertical zone, the third vertical zone, the fourth vertical zone, and the fifth vertical zone.

5. The cleaning method according to claim 2, wherein the second processing section comprises an intermediate zone and two side zones; the two side zones are provided at two sides of the intermediate zone and are connected to the intermediate zone; wherein controlling the second processing section comprises:

detecting the width of the object to be cleaned;

in response to detecting that the width of the object to be cleaned is less than that of the intermediate zone, only turning on the intermediate zone; and in response to detecting that the width of the object to be cleaned is greater than that of the intermediate zone, turning on the intermediate zone and the two side zones.

6. The cleaning method according to claim 2, wherein the second processing section is divided into at least two horizontal regions in a direction perpendicular to an advancing direction of the object to be cleaned; and wherein controlling the second processing section comprises:

detecting the position of the object to be cleaned;

in response to detecting that a front edge of the object to be cleaned in the advancing direction enters each of the at least two horizontal regions of the second processing section, turning on this corresponding horizontal region; and in response to detecting that a rear edge of the object to be cleaned in the advancing direction leaves each of the at least two horizontal regions of the second processing section, then turning off this corresponding horizontal region.

7. The cleaning method according to claim 2, wherein the object to be cleaned is a glass substrate used for manufacturing a display panel, and the glass substrate is placed horizontally to be cleaned; wherein the second processing section of the cleaning device comprises an upper portion disposed above the glass substrate and configured for air cleaning an upper side of the glass substrate, and a lower portion disposed under the glass substrate and configured for air cleaning a lower side of the glass substrate, and wherein controlling the second processing section for air cleaning the glass substrate comprises:

simultaneously air cleaning the upper side of the glass substrate using the upper portion of the second processing section and cleaning the lower side of the glass substrate using the lower portion of the second processing section.

8. The cleaning method according to claim 7, wherein each of the upper portion and the lower portion of the second processing section of the cleaning device comprises at least two horizontal elongated portions perpendicular to an advancing direction of the glass substrate when being conveyed in the cleaning device, wherein each of the at least two horizontal elongated portions is divided into an intermediate zone and two side zones that are provided at two outer sides of the intermediate zone and that are connected to the intermediate zone, wherein controlling the second processing section comprises:

detecting a position of the glass substrate to be air cleaned;

in response to detecting that a front edge of the glass substrate to be cleaned in the advancing direction enters each of the at least two horizontal elongated portions of the second processing section, turning on this horizontal elongated portion for air cleaning the glass substrate; and in response to detecting that a rear edge of the glass substrate to be cleaned in the advancing direction leaves each of the at least two horizontal elongated portions of the second processing section, turning off this horizontal elongated portion to stop air cleaning the glass substrate.

\* \* \* \* \*